United States Patent
Knight, Jr. et al.

(10) Patent No.: US 7,333,876 B2
(45) Date of Patent: Feb. 19, 2008

(54) SYSTEMS AND METHODS FOR PROVIDING ELECTRONIC QUALITY CONTROL IN A PROCESS FOR APPLYING A POLYURETHANE TO A SUBSTRATE

(75) Inventors: Charles E. Knight, Jr., Baton Rouge, LA (US); Augusto C. Ibay, Acworth, GA (US)

(73) Assignee: Isotec International, Inc,, Canton, GA (US)

(*) Notice: Subject to any disclaimer, the term of this patent is extended or adjusted under 35 U.S.C. 154(b) by 253 days.

(21) Appl. No.: 11/087,216

(22) Filed: Mar. 22, 2005

(65) Prior Publication Data

US 2006/0200263 A1 Sep. 7, 2006

Related U.S. Application Data

(60) Provisional application No. 60/657,491, filed on Mar. 1, 2005.

(51) Int. Cl.
  G06F 19/00 (2006.01)
  G05B 21/00 (2006.01)
  G01N 37/00 (2006.01)
  B05C 11/00 (2006.01)

(52) U.S. Cl. ............ 700/123; 700/108; 700/175; 700/180; 700/266; 702/82; 901/43; 118/663

(58) Field of Classification Search ............ 700/95, 700/108–110, 119, 123, 174, 175, 180, 266; 702/82, 84; 901/43; 118/663, 665–669, 118/680–681, 688, 692, 696–698

See application file for complete search history.

(56) References Cited

U.S. PATENT DOCUMENTS

| | | |
|---|---|---|
| 4,039,516 A | 8/1977 | Niederdellmann et al. |
| 4,131,606 A | 12/1978 | Ammons |
| 4,456,744 A | 6/1984 | Kamatani et al. |
| 4,592,947 A | 6/1986 | Hunter et al. |
| 4,663,417 A | 5/1987 | Hunter et al. |
| 4,666,758 A | 5/1987 | Hunter et al. |
| 4,938,825 A | 7/1990 | Macdonald |
| 5,296,544 A | 3/1994 | Heise et al. |
| 5,418,311 A | 5/1995 | Schafer et al. |
| 5,554,686 A | 9/1996 | Frisch, Jr. et al. |
| 5,733,966 A | 3/1998 | Cline et al. |
| 5,976,304 A | 11/1999 | Horvath et al. |
| 6,040,028 A | 3/2000 | Cline et al. |

(Continued)

Primary Examiner—Leo Picard
Assistant Examiner—Sean Shechtman
(74) Attorney, Agent, or Firm—King & Spalding

(57) ABSTRACT

The present invention comprises systems and methods for providing electronic quality control in a process for applying a polyurethane to a substrate. One aspect of the present invention includes a computer-implemented method for providing electronic quality control during manufacturing of a polyurethane coated article. The method can include providing a user interface for a user to input at least one operating characteristic associated with a process for manufacturing a polyurethane coated article. Furthermore, the method can include receiving a selection of at least one operating characteristic from the user, and receiving at least one condition associated with the operating characteristic. Moreover, the method can include monitoring a process for manufacturing a polyurethane coated article, wherein a change to the operating characteristic can be detected. The method can also include generating a notification if the at least one condition is detected.

42 Claims, 8 Drawing Sheets

U.S. PATENT DOCUMENTS

| | | |
|---|---|---|
| 6,046,295 A | 4/2000 | Frisch, Jr. et al. |
| 6,103,851 A | 8/2000 | Roser et al. |
| 6,521,298 B1 | 2/2003 | Banks |
| 2004/0003773 A1* | 1/2004 | Kato et al. .................. 118/317 |
| 2004/0030514 A1* | 2/2004 | Popp et al. ................... 702/81 |
| 2004/0185583 A1* | 9/2004 | Tomoyasu et al. ............. 438/8 |

* cited by examiner

FIGURE 6

SYSTEMS AND METHODS FOR PROVIDING ELECTRONIC QUALITY CONTROL IN A PROCESS FOR APPLYING A POLYURETHANE TO A SUBSTRATE

RELATED APPLICATIONS

This application claims the benefit to U.S. Provisional Application No. 60/657,491 entitled "Use of Electronic Quality Control Equipment In Manufacturing of Polyurethane Based Materials and Composites and Articles There From," filed on Mar. 1, 2005, which is hereby incorporated by reference.

FIELD OF THE INVENTION

The invention relates, in general, to systems and methods for providing quality control in a process for applying a coating. In particular, the invention relates to systems and method for providing electronic quality control in a process for applying a polyurethane coating to a substrate.

BACKGROUND OF THE INVENTION

One method of manufacturing plastic/acrylic signs, bath tubs, sinks, spas, marine parts and the like includes forming a thermoplastic substrate with a high surface finish or other types of substrates and attaching a secondary layer(s) by spraying a mixture of fiberglass and polyester resin thereon. The sprayed-on material can then be subjected to patting and rolling to smooth down the entrapped fiberglass and remove any air pockets. The substrate can then be allowed to cure at ambient temperature to achieve a coated fiberglass and polyester resin reinforced substrate. Another method includes a process for applying a polyurethane coating formed from simultaneously mixing and spray applying at least two polyurethane components to a thermoformed substrate which is nearly 100% reactive and releases little or no styrene. This process generates sufficient adhesion to the thermoformed part and the required strength for its intended use.

The above methods and systems employing this and similar methods are typically manually operated or require skilled labor. However, any problems with manual operation or skilled labor, such as training or incorrect application of one or more mixtures can lead to manufacturing defects in the finished product. For example, if a suitable substrate temperature is not achieved prior to applying a polyurethane coating to the substrate, the polyurethane coating may not properly adhere to the substrate. In yet another example, if during the coating process the substrate temperature is too high, the substrate may soften and distort in shape. In another example, in a multi-component polyurethane coating for a substrate, if the components are not properly mixed, poor adhesion and/or delamination of the coating can occur causing blisters or bubbles which may not be manifested or observed until several months after the coating is applied. Yet another example involves the negative effect of moisture on the surface of the substrate to be coated with the polyurethane. The relative humidity, ambient temperature, or dew point during the application of polyurethane coating components can adversely affect the coating properties, causing blistering or bubbling in the material, thus possibly leading to defects during manufacturing or several months afterwards. Manufacturing defects are not normally detected during the manufacturing phase, thus numerous products may be made, packaged, and shipped to customers long before a defect can be detected. Once a manufacturing defect is detected, the finished product is likely to be in use by a customer or on the shelf of a retailer or distributor, thus recalling the defective product can be difficult, expensive, and time consuming.

Therefore a need exists for systems and methods for monitoring and controlling operating characteristics used in a process for manufacturing production parts. Another need exists for systems and methods for alerting personnel to deviations outside preferred operating characteristics used in a manufacturing process. Yet another need exists for systems and methods for recording operating characteristics used during manufacturing. Another need exists for systems and methods for monitoring and controlling laminate thickness for articles of manufacture. Still another need exists for systems and methods for providing electronic quality control for applying a polyurethane coating to a substrate. Yet another need exists for systems and methods for providing electronic quality control for manufacturing a polyurethane coated article.

SUMMARY OF THE INVENTION

The present invention can be used in the manufacturing of finished articles utilizing polyurethane or polyurea coatings or compositions to rigidize or coat parts. The present invention includes an electronic quality control (EQC) system, also known as an electronic monitoring and control equipment system (electronic process control or EPC system) that can be used in conjunction with the equipment used to apply the material to form finished articles. Examples of finished articles can include, but are not limited to, reinforced thermoformed composite plastics, such as spas, bathtubs, and sinks or "spray up" coating laminate systems to form bathware items, such as tubs and showers. The equipment can electronically monitor the process and can help prevent the manufacture of high volume parts with potential, "hidden" quality problems arising from production outside of recommended, preferred, or otherwise desired operating characteristics.

The term "operating characteristic" used herein refers to any measurable input or output associated with any equipment, component, or system used in a manufacturing process. For example, in a process to apply a polyurethane coating to a substrate, examples of operating characteristics for a spray area with a rotatable turntable or platform supporting a work piece substrate can include, ambient temperature, relative humidity, and temperature of the substrate, position of the rotatable turntable or platform, and rotation rate of the rotatable turntable or platform. Operating characteristics can be associated with one or more "conditions," for example, a value, a setting, a range of values, a percentage, an upper limit, and a lower limit. The term "desired parameters" used herein refers to the preferred qualities of an article of manufacture made during a process, such as a process to apply a polyurethane coating to a substrate, using one or more operating characteristics and associated conditions.

Systems and processes according to various aspects and embodiments according to the invention address some or all of these issues and combinations of them. They do so by providing at least a computer-implemented method for providing electronic quality control during manufacturing of a polyurethane coated article. The method can include providing a user interface for a user to input at least one operating characteristic associated with a process for manufacturing a polyurethane coated article. The method can also include receiving a selection of at least one operating characteristic from the user, and receiving at least one condition associated with the operating characteristic. Furthermore, the method can include monitoring a process for manufacturing a polyurethane coated article, wherein a change to the operating characteristic can be detected. Moreover, the method can include generating a notification if the at least one condition is detected.

In one aspect of an embodiment of the invention, providing a user interface for a user to input at least one operating characteristic associated with a process for manufacturing a polyurethane coated article comprises providing a computer program to receive user input for operating a process for manufacturing a polyurethane coated article.

In one aspect of an embodiment of the invention, an operating characteristic comprises at least one of the following: fluid pressure, fluid pressures for more than one components of a coating applied by a proportioning system, fluid temperature, relative humidity, ambient humidity, dew point, ambient temperature, air volume, air pressure, component fluid temperatures, component fluid pressures, operating status (on/off), output rate of mixed material, output rate of a component material, position of an arm associated with the spray robot, position of a spray gun or device associated with the spray robot, position of a turntable/platform, rotation rate of a turntable/platform, stroke count, surface temperature of a work piece substrate, air flow, and inlet air pressure.

In one aspect of an embodiment of the invention, receiving at least one condition associated with the operating characteristic comprises at least one of the following: receiving a value for the operating characteristic, receiving a setting for the operating characteristic, receiving a range of values for the operating characteristic, receiving an upper limit value for the operating characteristic, receiving a lower limit value for the operating characteristic, receiving a percentage change over time value associated with the operating characteristic, receiving a percentage associated with the operating characteristic, and receiving a condition associated with operation of a device.

In one aspect of an embodiment of the invention, the process comprises at least one of the following: spraying a polyurethane coating on a work piece, spraying a polyurethane coating on a material, coating a shell with a polyurethane, coating a shell with at least one flow provided by a spray gun, coating a shell with at least one flow provided by a spray robot, and spraying at least one material on another material.

In one aspect of an embodiment of the invention, generating a notification comprises at least one of the following: activating an alarm, activating a light, activating a set of lights, transmitting a message to a remote communication device, transmitting an e-mail, and displaying a message on a display.

In one aspect of an embodiment of the invention, the method further comprises storing data during monitoring of the process associated with manufacturing a polyurethane coated article, wherein the data includes information associated with the operating characteristic.

In one aspect of an embodiment of the invention, the data is stored in at least one of the following: an EQC database, a database, memory, and a data storage device.

In one aspect of an embodiment of the invention, the method further comprises displaying data during monitoring the process for manufacturing a polyurethane coated article.

In one aspect of an embodiment of the invention, the data is displayed on at least one of the following: a display, a light, a set of lights, a display monitor, a remote communication device, a smart phone, an e-mail device, and a PDA.

In one aspect of an embodiment of the invention, the method further comprises in response to the notification, receiving an instruction to correct the at least one condition.

In one aspect of an embodiment of the invention, the method further comprises identifying at least one trend associated with the data during monitoring the process, and displaying the at least one trend with respect to data associated with the at least one condition.

Another aspect of an embodiment of the invention comprises an electronic quality control system for manufacturing a polyurethane coated article. The system comprises a user interface adapted to receive a user input of at least one operating characteristic associated with a process for manufacturing a polyurethane coated article. The system can also include a processor adapted to receive a selection of at least one operating characteristic from the user. The processor can be further adapted to receive at least one condition associated with the operating characteristic. Furthermore, the processor can be adapted to monitor a process for manufacturing a polyurethane coated article, wherein a change to the operating characteristic can be detected. Moreover, the processor can be adapted to generate a notification if the at least one condition is detected.

In one aspect of an embodiment of the invention, the user interface comprises a computer program adapted to receive user input for monitoring and controlling a process for manufacturing a polyurethane coated article.

In one aspect of an embodiment of the invention, an operating characteristic comprises at least one of the following: fluid pressure, fluid pressures for more than one components of a coating applied by a proportioning system, fluid temperature, relative humidity, ambient humidity, dew point, ambient temperature, air volume, air pressure, component fluid temperatures, component fluid pressures, operating status (on/off), output rate of mixed material, output rate of a component material, position of an arm associated with the spray robot, position of a spray gun or device associated with the spray robot, position of a turntable/platform, rotation rate of a turntable/platform, stroke count, surface temperature of a work piece substrate, air flow, and inlet air pressure.

In one aspect of an embodiment of the invention, to receive at least one condition associated with the operating characteristic comprises at least one of the following: receiving a value for the operating characteristic, receiving a setting for the operating characteristic, receiving a range of values for the operating characteristic, receiving an upper limit value for the operating characteristic, receiving a lower limit value for the operating characteristic, receiving a percentage change over time value associated with the operating characteristic, receiving a percentage associated with the operating characteristic, and receiving a condition associated with operation of a device.

In one aspect of an embodiment of the invention, the process comprises at least one of the following: spraying a polyurethane coating on a work piece, spraying a polyurethane coating on a material, coating a shell with a polyurethane, coating a shell with at least one flow provided by a spray gun, coating a shell with at least one flow provided by a spray robot, and spraying at least one material on another material.

In one aspect of an embodiment of the invention, generate a notification comprises at least one of the following: activating an alarm, activating a light, activating a set of lights, transmitting a message to a remote communication device, transmitting an e-mail, and displaying a message on a display.

In one aspect of an embodiment of the invention, the processor is further adapted to store data during monitoring the process for manufacturing a polyurethane coated article, wherein the data includes information associated with the operating characteristic.

In one aspect of an embodiment of the invention, the data is stored in at least one of the following: an EQC database, a database, memory, and a data storage device.

In one aspect of an embodiment of the invention, the processor is further adapted to display data during monitoring the process for manufacturing a polyurethane coated article.

In one aspect of an embodiment of the invention, the data is displayed on at least one of the following: a display, a light, a set of lights, a display monitor, a remote communication device, a smart phone, an e-mail device, and a PDA.

In one aspect of an embodiment of the invention, the processor is further adapted to in response to the notification, receive an instruction to correct the at least one condition.

In one aspect of an embodiment of the invention, the processor is further adapted to identify at least one trend associated with the data during monitoring the process, and display the at least one trend with respect to data associated with the at least one condition.

Another aspect of the invention includes a computer-implemented method for providing electronic quality control for manufacturing of a polyurethane coated article with a spray robot. The method can include providing a user interface for a user to input at least one operating characteristic associated with a process for manufacturing a polyurethane coated article, wherein the user interface comprises providing a computer program to receive the user input. The method can also include receiving a selection of at least one operating characteristic from the user, and receiving at least one condition associated with the operating characteristic. Furthermore, the method can include monitoring a process for manufacturing a polyurethane coated article, wherein a change to the operating characteristic can be detected. In addition, the method can include storing data during monitoring of the process for manufacturing a polyurethane coated article, wherein the data includes information associated with the operating characteristic. Moreover, the method can include displaying data during monitoring the process for manufacturing a polyurethane coated article. The method can also include generating a notification if the at least one condition is detected.

In one aspect of an embodiment of the invention, an operating characteristic comprises at least one of the following: fluid pressure, fluid pressures for more than one components of a coating applied by a proportioning system, fluid temperature, relative humidity, ambient humidity, dew point, ambient temperature, air volume, air pressure, component fluid temperatures, component fluid pressures, operating status (on/off), output rate of mixed material, output rate of a component material, position of an arm associated with the spray robot, position of a spray gun or device associated with the spray robot, position of a turntable/platform, rotation rate of a turntable/platform, stroke count, surface temperature of a work piece substrate, air flow, and inlet air pressure.

In one aspect of an embodiment of the invention, receiving at least one condition associated with the operating characteristic comprises at least one of the following: receiving a value for the operating characteristic, receiving a setting for the operating characteristic, receiving a range of values for the operating characteristic, receiving an upper limit value for the operating characteristic, receiving a lower limit value for the operating characteristic, receiving a percentage change over time value associated with the operating characteristic, receiving a percentage associated with the operating characteristic, and receiving a condition associated with operation of a device.

In one aspect of an embodiment of the invention, the process comprises at least one of the following: spraying a polyurethane on a work piece, spraying a polyurethane on a material, coating a shell with a polyurethane, coating a shell with at least one flow provided by a spray gun, coating a shell with at least one flow provided by a spray robot, and spraying at least one material on another material.

In one aspect of an embodiment of the invention, generating a notification comprises at least one of the following: activating an alarm, activating a light, activating a set of lights, transmitting a message to a remote communication device, transmitting an e-mail, and displaying a message on a display.

In one aspect of an embodiment of the invention, the data is stored in at least one of the following: an EQC database, a database, memory, and a data storage device.

In one aspect of an embodiment of the invention, the data is displayed on at least one of the following: a display, a light, a set of lights, a display monitor, a remote communication device, a smart phone, an e-mail device, and a PDA.

In one aspect of an embodiment of the invention, the method further comprises in response to the notification, receiving an instruction to correct the at least one condition.

In one aspect of an embodiment of the invention, the method further comprises identifying at least one trend associated with the data during monitoring the process, and displaying the at least one trend with respect to data associated with the at least one condition.

Objects, features and advantages of various systems and processes according to various embodiments of the present invention include:

(1) Systems and methods for monitoring and controlling some or all operating characteristics used in a process for manufacturing production parts;

(2) Systems and methods for alerting personnel to deviations outside preferred operating characteristics used in a manufacturing process;

(3) Systems and methods for recording historical records of some or all operating characteristics used during a manufacturing process;

(4) Systems and methods for monitoring and controlling laminate thickness for articles of manufacture;

(5) Systems and methods for providing electronic quality control for applying a polyurethane coating to a substrate;

(6) Systems and methods for providing electronic quality control for manufacturing a polyurethane coated article; and (7) Systems and methods for providing electronic quality control for manufacturing a polyurethane coated article with a spray robot.

Other objects, features and advantages will become apparent with respect to the remainder of this document.

BRIEF DESCRIPTION OF THE DRAWINGS

These and other features, aspects, and advantages of the present invention are better understood when the following Detailed Description is read with reference to the accompanying drawings, wherein:

FIG. 6 illustrates a user interface for a system according to an embodiment of the present invention.

DETAILED DESCRIPTION

Figure 1:
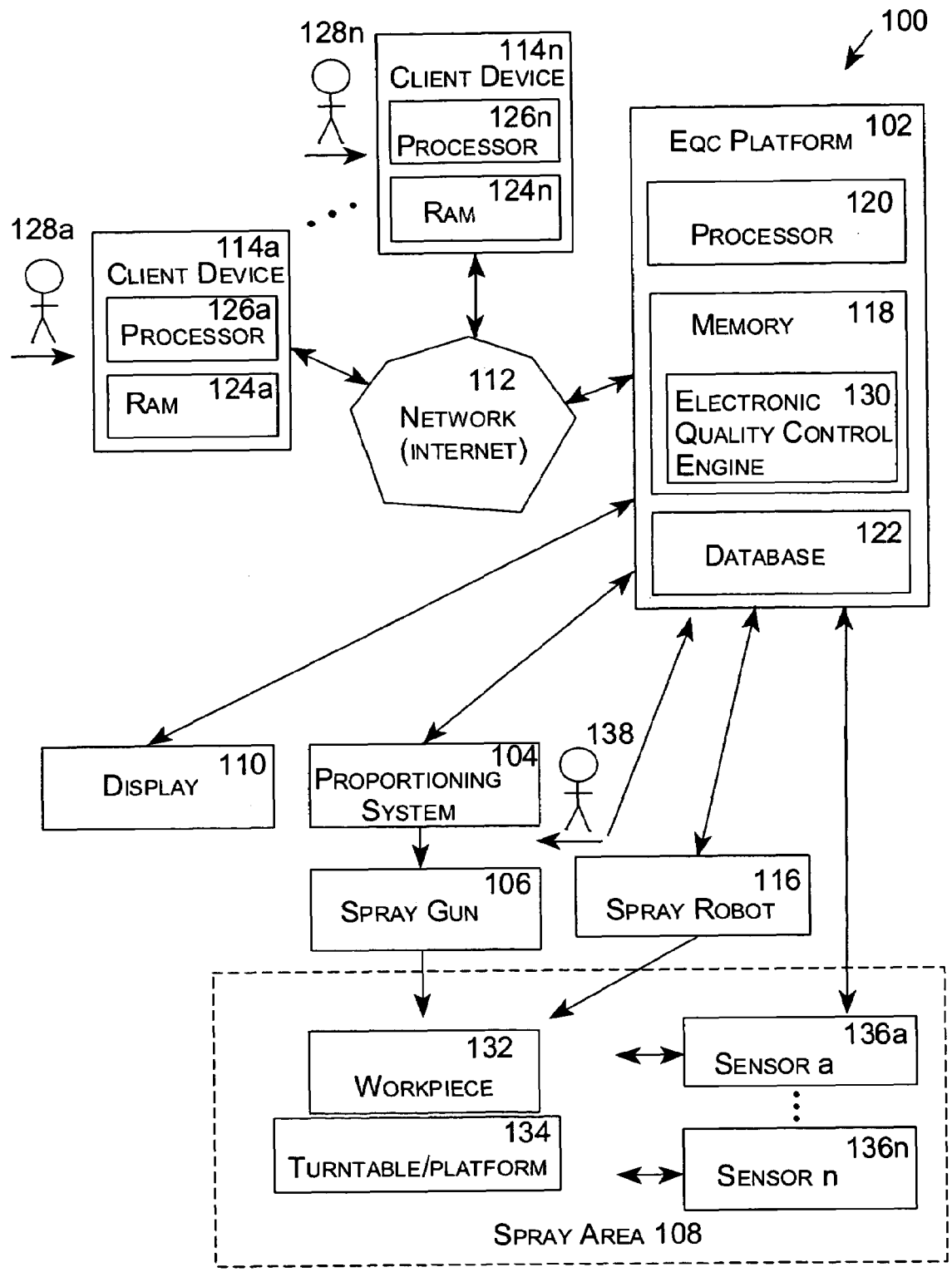
FIG. 1 illustrates a schematic view diagram of a system according to an embodiment of the present invention.

Various systems in accordance with the present invention may be constructed. FIG. 1 is a diagram illustrating an exemplary system in which exemplary embodiments of the present invention may operate. The present invention may operate, and be embodied in, other systems as well.

Referring now to the drawings in which like numerals indicate like elements throughout the several figures, FIG. 1 is a diagram illustrating an exemplary environment for implementation of an embodiment of the present invention. The system 100 shown in FIG. 1 comprises an EQC platform 102, a proportioning system 104, a spray gun 106, a spray area 108, a display 110, a network 112, and one or more client devices 114a-n. In at least one embodiment, the system 100 can also include a spray robot 116. The system 100 is configured to perform a process such as a process to apply polyurethane to a substrate. An example of a process to apply polyurethane to a substrate is shown and described in U.S. Pat. No. 6,521,298, entitled "Process for Applying Polyurethane to a Substrate," the disclosure of which is hereby incorporated by reference. The system 100 can be adapted to perform other processes in accordance with other embodiments of the invention.

The EQC platform 102 comprises a computer-readable medium, such as a random access memory (RAM) 118 coupled to or integrated with a processor 120. The EQC platform 102, depicted as a single computer system, may be implemented as a network of computer processors. Examples of an EQC platform 102 are servers, mainframe computers, networked computers, a processor-based device, and similar types of systems and devices. In one embodiment, the EQC platform 102 can be implemented as a network of processors 120, such as a network of programmable logic controllers.

The processor 120 executes computer-executable program instructions stored in a memory 118. Such processors may comprise a microprocessor, a programmable logic controller (PLC), an ASIC, and state machines. Such processors comprise, or may be in communication with, media, for example computer-readable media, which stores and communicates instructions that, when executed by the processor, cause the processor to perform the steps described herein. Processor 120 can be any of a number of computer processors, such as processors from Intel Corporation of Santa Clara, Calif. and Motorola Corporation of Schaumburg, Ill. Embodiments of computer-readable media include, but are not limited to, an electronic, optical, magnetic, or other storage or transmission device capable of providing a processor, such as the processor 120 with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript.

The processor 120 shown is in communication with an EQC database 122 or other data storage device. The EQC database 122 or other data storage device can be integrated with or can be a separate component from the EQC platform 102. In one embodiment, the processor 120 can be in communication with a client device 114a-n, and store information or other data in an associated memory or in a data storage device associated with the client device 114a-n.

Client devices 114a-n each comprise a computer-readable medium, such as a random access memory (RAM) 124a coupled to a processor 126a. Other peripheral components can also be associated with a client device 114a-n, such as a display monitor, hard drive, printer, network card, etc. The processor 126a executes computer-executable program instructions stored in memory 124a. One example of computer-executable program instructions includes ProTool Pro Runtime software, distributed by Siemens AG of Munich, Germany. Such processors may comprise a microprocessor, an ASIC, and state machines. Such processors comprise, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 126a of client 114a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript.

Client devices 114a-n may also comprise a number of external or internal devices such as a mouse, a CD-ROM, DVD, a keyboard, a display, or other input or output devices. Examples of client devices 114a-n are personal computers, digital assistants, personal digital assistants (PDAs), cellular phones, mobile phones, smart phones, pagers, digital tablets, laptop computers, Internet appliances, and other processor-based devices. In general, a client device 114a may be any type of processor-based platform that is connected to a network 112 and that interacts with one or more application programs. Client devices 114a-n may operate on any operating system capable of supporting a browser or browser-enabled application, such as Microsoft® Windows® or Linux. The client devices 114a-n shown include, for example, personal computers executing a browser application program such as Microsoft Corporation's Internet Explorer™, Netscape Communication Corporation's Netscape Navigator™, and Apple Computer, Inc.'s Safari™.

Through the client devices 114a-n, users 128a-n can communicate over the network 112 with each other and with other systems and devices coupled to the network 112. As shown in FIG. 1, the EQC platform 102 is also coupled to the network 112, and can communicate with the client devices 114a-n. The network 112 can be the Internet, a local area network, a wide area network, or any wired or wireless communications network.

The EQC platform 102 shown comprises a processor executing an electronic quality control (EQC) application program, also known as an EQC engine 130. In one embodiment, the EQC platform comprises a series of linked PLC processors executing an electronic quality control (EQC) application program, such as EQC engine 130. The EQC engine 130 can receive input from a user, such as a set of instructions, to perform a process, such as a process to apply polyurethane to a substrate. In one embodiment, the process can include a Boolean operation based on one or more inputs from associated sensors compared to corresponding operating characteristics and conditions stored in memory. In this example, the Boolean operation can generate a signal for an alarm based in part on at least a sensor input for fluid mixing pressures compared to a minimum value for the corresponding operating characteristic. In this manner, the EQC engine 130 can monitor and control operating characteristics to minimize any errors in a process, such as a process to apply polyurethane to a substrate.

The EQC engine 130 can provide a user interface to facilitate generation of a process flow for the system 100 to perform. An example of a user interface to facilitate generation of a process flow is illustrated as 800 in FIGS. 8A and 8B. The user input, set of instructions, or process flow can then be stored in the EQC database 122 or other data storage device for subsequent retrieval. Upon receipt of a user input, set of instructions, or process flow, the EQC engine 130 can facilitate a process based in part on at least the user input, set of instructions, or process flow. Multiple user inputs, sets of instructions, process flows, and any combination thereof can be received, facilitated, and stored by the EQC engine 130.

In one embodiment, one or more sets of instructions or programs can be generated by a user 128a-n or operator user 138, and stored by the EQC engine 130 in an EQC database 122 or other data storage device. Each set of instructions or program can include user inputs, instructions, process flows, or any combination thereof for facilitating the monitoring and control of a process, such as a process to apply polyurethane to a substrate. The user 128a-n, operator user 138, or EQC engine 130 can retrieve previously stored sets of instructions or programs and implement the sets of instructions or programs as needed. Generally, user inputs, sets of instructions, and process flows are selected to achieve desired parameters for an article of manufacture, such as a product manufactured during a process to apply polyurethane to a substrate. Desired parameters can include, but are not limited to, a coating thickness, weight of a material to be applied to a substrate, and weight of coating to be applied to a molded products. A user input can include, but is not limited to, setting a range for an operating characteristic, setting a lower limit for an operating characteristic, setting an upper limit for an operating characteristic, selecting or setting a value or condition for an operating characteristic, a temperature of a molded product, a spray pattern, indexed movement of a turntable, fluid pressures of polyurethane components, air pressure input to spray machine, temperature of polyurethane components, part or substrate temperature, spray output rate, relative humidity, ambient temperature, and dew point calculation. A set of instructions can include, but is not limited to, a spray pattern, mixing of polyurethane components, an indexed movement of a turntable/platform associated with a spray area, one or more operations in a process, and a hierarchical order for one or more operations to be performed. A process flow can include, but is not limited to, a flowchart, a schematic diagram for a process, or a series of one or more operations with a hierarchical order for the operations to be performed.

For the embodiment shown in FIG. 1, a preferred desired parameter for an article of manufacture can include: a final thickness of approximately $\frac{1}{8}$ to $\frac{3}{8}$ inches of a Acrylobond™ polyurethane composition or coating applied to a substrate.

In one example, a series of push buttons or controls (not shown) associated with the EQC platform 102 can be pre-programmed with a different set of instructions. Each set of instructions corresponds to a different product for a particular customer, such as a product line of hot tub spas for a hot tub spa distributor or manufacturer. When a pre-programmed button for a first type or model of hot tub spa is activated, the EQC engine can retrieve a previously stored set of instructions corresponding to the first type or model of hot tub spa.

In another example, a bar code associated with a particular product such as a first type or model of hot tub spa can be associated with a particular set of instructions. When the bar code is entered into or otherwise received by the EQC platform via a sensor such as 136a-n, then the particular set of instructions can be retrieved by the EQC engine 130. In this manner, a user 128a-n or operator user 138 can generate, store, and select different sets of instructions for various processes associated with different desired products.

The EQC engine 130 can also continuously monitor in real time any aspect of the system 100, including some or all operating characteristics associated with the proportioning system 104, spray gun 106, spray area 108, and spray robot 116. The EQC engine 130 can also provide a user interface for a user 128a-n or operator user 138 to monitor and control a process flow for the system 100. Some or all monitored operating characteristics can be displayed by the EQC engine 130 in any suitable format including, but not limited to, bar graph, graph, and alphanumeric data. An example of a user interface to monitor and control a process flow is illustrated as 700 in FIG. 7. For example, an EQC engine 130 can continuously monitor in real time some or all operating characteristics associated with the proportioning system 104, spray gun 106, spray area 108, and spray robot 116 during a process to apply polyurethane to a substrate. Information and data collected or otherwise received by the EQC engine 130 can be stored in the EQC database 122 or other data storage device. The EQC engine 130 can also allow a user, such as 128a, to interact with and receive real time information and notifications from the EQC engine 130. Current and previously stored information can be retrieved or otherwise used by a user, such as 128a.

The EQC engine 130 can also operate in conjunction with the proportioning system 104 and spray gun 106. In the embodiment shown in FIG. 1, the proportioning system can include a series of pumps to control and regulate the flow of one or more fluid streams. For example, the proportioning system can control and regulate the flow of individual components for a two-component polyurethane composition used in a process to apply the polyurethane to a substrate. An example of a proportioning system is shown as 23 in FIG. 2. An example of a suitable proportioning system is a Reactor™ proportioning system manufactured by Graco Inc. of Minneapolis, Minn.

For the embodiment shown in FIG. 1, a preferred set of operating characteristics for a proportioning system and spray gun can include: a lower limit fluid pressure for two polyurethane components of approximately 900 psi, no upper limit fluid pressure for two polyurethane components, a lower limit inlet air pressure of approximately 100 psi, a lower limit ambient temperature of approximately 60° F., a dew point of approximately 10° F. above the ambient temperature.

One or more operating characteristics of the proportioning system 104 can be controlled or otherwise monitored by the EQC engine 130. Sensors (not shown) associated with the proportioning system 104 can be in communication with the EQC engine 130, or operating characteristics of the proportioning system 104 can be directly transmitted to the EQC engine 130 for processing. Sensors can include, but are not limited to, fluid pressure sensors and fluid temperature sensors, and air pressure and flow sensors. Operating characteristics for a proportioning system can include, but are not limited to, fluid pressure, fluid pressures for more than one components of a coating applied by a proportioning system, fluid temperature, relative humidity, ambient humidity, dew point, ambient temperature, air volume, air pressure, output rate of mixed material, and output rate of a component material.

The spray gun 106 can connect to the proportioning system 104, and can be separately monitored and controlled by the EQC engine 130. The spray gun 106 can further regulate, mix, and direct the fluid streams received from the proportioning system 104 to be used in a process, such as process to apply a polyurethane composition to a substrate. An example of a spray gun 106 is shown as 225 in FIG. 2, and is shown in greater detail in FIG. 3. A suitable spray gun can be a solvent or mechanical purge-type spray device. An example of a suitable spray gun is a Fusion™ spray gun manufactured by Graco Inc. of Minneapolis, Minn.

One or more operating characteristics of the spray gun 106 can be controlled or otherwise monitored by the EQC engine 130. Sensors associated with the spray gun 106 can be in communication with the EQC engine 130, or operating characteristics of the spray gun 106 can be transmitted directly to the EQC engine 130. Operating characteristics for a spray gun can include, but are not limited to, component fluid temperatures, component fluid pressures, operating status (on/off), output rate of mixed materials, and output rate of a component material.

In at least one embodiment, the EQC engine 130 can operate in conjunction with the spray area 108 and spray robot 116. The spray robot 116 can include an automated robotic arm with a spray gun similar to 106, or another suitable spraying device. The spray robot 116 can be adapted for use in a process, such as process to apply polyurethane to a substrate. A spray robot, such as 116, can be further adapted to facilitate application of a uniform, controlled thickness of material to a workpiece substrate 132 in a spray area 108 while the substrate 132 is rotated on an associated turntable/platform such as 134. The EQC engine 130 can coordinate a user input associated with a previously stored program for a particular model with desired actions or spray pattern performed by a spray robot, the rotation of the turntable/platform 134 bearing the substrate 132 with the flow rate of a polyurethane composition being applied by the spray robot 116. Various sensors 136a-n in the spray area 108 can provide surface temperature measurements to the EQC engine 130 while the spray robot 116 is in use to provide monitoring of any exothermic reactions caused by the chemical reaction of the polyurethane components. The EQC engine 130 can provide continuous feedback control of the rotation and flow rate based in part on at least the surface temperature measurements. If surface temperatures become out of a desired range, then the EQC engine 130 can generate a notification such as an alarm or a message via a display 110.

For the embodiment shown in FIG. 1, a preferred set of operating characteristics for a spray area and spray robot can include: initial surface temperature of a substrate approximately 95-115° F., an upper limit process (exothermic) surface temperature of a substrate of approximately 150° F.

Use of a spray robot 116 can improve manufacturing throughput speed in production over manual methods of production. Furthermore, use of a spray robot 116 can permit personnel, such as an operator user 138, to avoid or otherwise minimize his or her exposure to airborne chemicals associated with a process, such as process to apply polyurethane composition to a substrate. Moreover, use of a spray robot, such as 116, can permit temperatures associated with the spray area 108 to be monitored and controlled in ranges above those temperatures considered comfortable for personnel such as operator user 138, and in accordance with article temperatures desired or otherwise needed for the spray process, as described in U.S. Pat. No. 6,521,298. A suitable spray robot can be an articulated, multi-axis-type or three-axis gantry-type robot. An example of a suitable spray robot is a 6-axis-type robot such as Model 4400 30L, manufactured by the Automation Technologies division of Asea Brown Boveri (ABB) Ltd of Vasteras, Sweden.

One or more operating characteristics of the spray robot 116 can be controlled or otherwise monitored by the EQC engine 130. Sensors associated with the spray robot 116 can be in communication with the EQC engine 130, or operating characteristics of the spray robot 116 can be transmitted directly to the EQC engine 130. Operating characteristics for a spray robot can include, but are not limited to, ambient humidity, relative humidity, ambient temperature, position of an arm associated with the spray robot, position of a spray gun or device associated with the spray robot, position of a turntable/platform, rotation rate of a turntable/platform, and stroke count.

The EQC engine 130 can also operate in conjunction with the spray area 108. The spray area is an area where a process, such as a process to apply a polyurethane composition to a substrate, can be facilitated. The spray area 108, shown in FIG. 1, can include a work piece substrate 132 mounted on a turntable/platform 134. An example of a work piece substrate and turntable/platform combination can be an inverted spa substrate fabricated from vacuum formed acrylic mounted onto a rotatable platform, as shown as 212 and 223, respectively, in FIG. 2. One or more sensors 136a-n associated with the spray area 108 and in communication with the EQC engine 130 can be arranged inside or outside of the spray area 108. Sensors 136a-n can include, but are not limited to, infrared temperature sensors, temperature sensors, pressure sensors, surface temperature sensors, relative humidity sensors, bar code readers, radio frequency identification devices (RFID), or any other device capable of transmitting a signal or information to the EQC engine 130.

One or more operating characteristics of the spray area 108 can be controlled or otherwise monitored by the EQC engine 130. Operating characteristics for a spray area can include, but are not limited to, ambient humidity, relative humidity, ambient temperature, surface temperature of a work piece substrate, air pressure, and dew point.

The EQC engine 130 can also provide one or more prompts and/or feedback to an operator user, such as 138, operating the proportioning system 104, spray gun 106, spray area 108, or spray robot 116. Prompts and/or feedback can be provided to the operator user 138 via a display 110 or a set of displays. A display 110 can be a display monitor, a series of lights, or any other device visible to, or otherwise accessible by an operator user. Prompts and/or feedback can include, but are not limited to, visual, audible, tactile, other cues or indications, alerts, alarms, or any combination thereof. In one embodiment, the EQC engine 130 can provide, through a display 110, such as a series of lights, prompts and feedback to an operator user 138 operating the proportioning system 104, spray gun 106, and spray area 108. If for example, an operating characteristic associated with the proportioning system 104, spray gun 106, or spray area 108 is out of range or otherwise exceeds a predetermined limit, the EQC engine 130 can generate a notification to send to the operator user 138 through the display 110, such as a series of lights. For example, a light stack of two green lights and two red lights can provide feedback regarding the proportioning system 104 and spray gun 106 to the operator user, wherein the green lights indicate an acceptable range for an operating characteristic of interest, and the red lights indicate the operating characteristic of interest is out of range. In another example, an alarm can provide feedback regarding fluid temperatures of components dispensed by the proportioning system 104. If sensors associated with the proportioning system 104 indicate a fluid temperature out of a desired range, the EQC engine 130 can activate the alarm indicating the out of range temperature. Another example includes an alarm regarding output rate of single or mixed components from the proportioning system 104. and/or spray gun 106. The EQC engine 130 can monitor each rate on a cycle or pounds per minute basis, and if a maximum rate or limit is achieved, the EQC engine 130 can activate an alarm indicating the maximum rate or limit. In yet another example, if the initial surface temperature of a work piece substrate is not within a predetermined temperature range, an alert can be generated and transmitted to an operator user 138 indicating that the initial surface temperature is out of range, excessive, or insufficient. In another example, if during a process to apply a coating to the substrate, the surface temperature becomes out of range, an alarm can be generated and transmitted to an operator user 138 indicating that the surface temperature is out of range, excessive, or insufficient. In this manner, the operator user 138 can make adjustments as needed to the proportioning system 104, spray gun 106, or spray area 108 to adjust the operating characteristic of interest within a sufficient range or predetermined limit. In other instances, upon receipt of a notification from the EQC engine 130, the operator user 138 may stop a process until further analysis related to the operating characteristic of interest can be performed and the operating characteristic can be brought within a sufficient range or predetermined limit.

In at least one embodiment, the EQC engine 130 can include a set of instructions or program preventing initiation of a process of further instructions depending on the operating characteristics or conditions detected by one or more sensors 136a-n. For example, if the EQC engine 130 receives data from a sensor 136a-n associated with the spray area 108 indicating that a surface temperature of a work piece substrate 132 is not within a desired range, a set of instructions facilitated by the EQC engine 130 can cause the associated process to halt until a desired temperature is attained. In another example, if a sensor for a pump associated with a proportioning system 104 indicates fluid pressure is not within a desired range, a set of instructions facilitated by the EQC engine 130 can cause the associated process to halt until a desired fluid pressure is attained. In yet another example, if a sensor for a proportioning system 104 indicates air volume or air pressure is not within a desired range, a set of instructions facilitated by the EQC engine 130 can cause the associated process to halt until a desired air volume or air pressure is attained.

In another example, the EQC engine 130 may prompt a user, such as an operator user 138, operating the proportioning system 104, spray gun 106, or spray area 108 that a certain percentage, such as 25%, 50%, 75%, or 100%, of a desired coating amount for a particular work piece has been utilized or otherwise output during a coating process. The EQC engine 130 can-detect the amount of the required coating that has been used by the user during the coating process, and can generate a signal to activate, for example, a stack of four white lights indicative of 25%, 50%, 75%, and 100%, respectively, according to the amount of a desired coating that has been used. In this manner, the user can monitor the progress of the operation and during the operation the user can make decisions based on the progress of the operation.

In yet another example, the EQC engine 130 can monitor operating characteristics associated with the proportioning system 104, spray gun 106, and spray area 108. If an operating characteristic is out of range or otherwise exceeds a predetermined limit, the EQC engine 130 can generate a notification to send to a user 128a via a network 112, such as the Internet. The user 128a can receive the notification via a client device 114a, such as a smart phone or email device. In response to the notification, the user 128a can transmit a command or other instructions to the EQC engine 130 via the network 112, or could contact another user 128n via client device 114n, such as by e-mail, phone, or other communication device or method. In this manner, a user 128a-n in a remote location can monitor the operation and can make operating decisions with respect to operating characteristics detected by the EQC engine 130.

Figure 2:
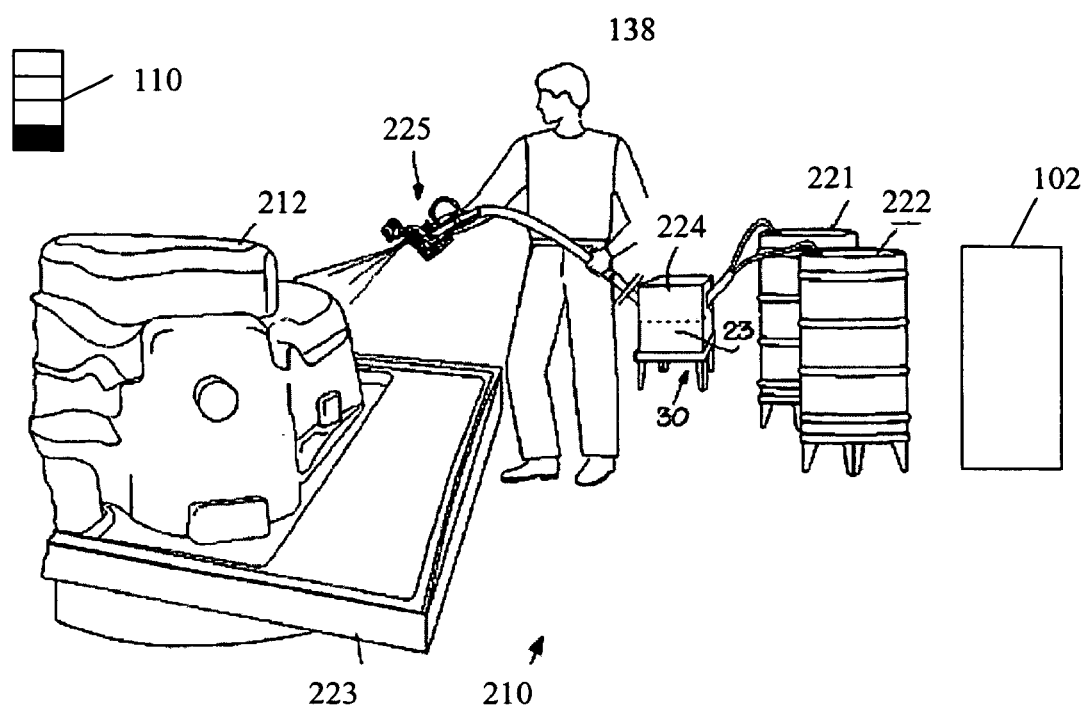
FIG. 2 illustrates a schematic view of an inverted substrate mounted onto a rotating platform in accordance with one embodiment of the present invention.
Figure 3:
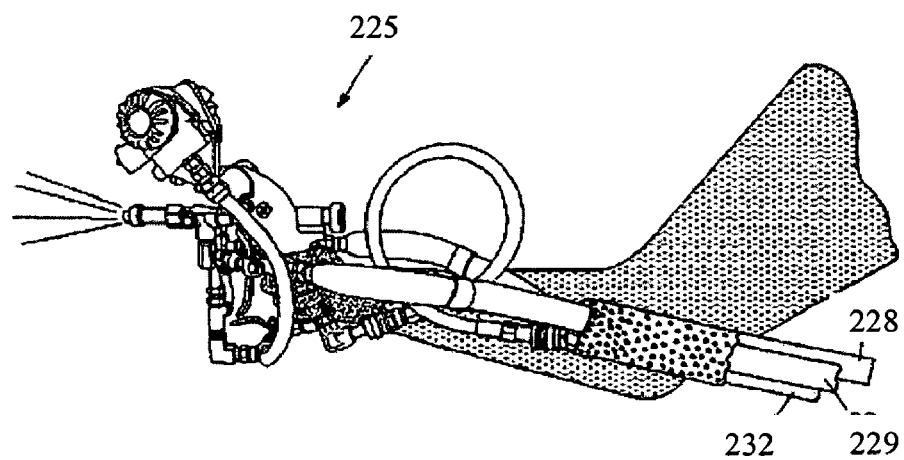
FIG. 3 illustrates a schematic view diagram of a spraying mechanism associated with the embodiment shown in FIG. 1.

One example of a use of an EQC system 100 is in a process, such as a process 210 to apply a polyurethane composition to a substrate as illustrated in FIG. 2. In this example, the work-piece substrate 212 is an inverted spa substrate fabricated from vacuum formed acrylic mounted onto a rotating platform 223. The substrate 212 may, if desired, be thermoformed bathtubs, sinks, shower stalls or signage made from acrylic or co-extruded ABS/acrylic. A process for applying a polyurethane elastomer formulated from VOC-free reactants can be facilitated in the work area 108 by an operator user 138 operating the EQC platform 102 in conjunction with a proportioning system 104 and spray gun 106, such as the proportioning apparatus 30 and the spray gun 225. The polyurethane is a two part formulation of a polyol resin reactant, such as contained in a container 221 and an isocyanate reactant, such as contained in a second container 222. The polyol resin reactant and the isocyanate reactant are fed to the proportioning apparatus 30, which includes a proportioning pump portion 224 and a reactant heater portion 23. The reactants are separately proportioned, pressurized and heated in the proportioning apparatus 30 then the proportioned, pressurized and heated reactants are separately fed to the spray gun 225 via hoses 228, 229, 232 where the reactants are mixed together and applied to the substrate 212. The proportionate volume ratio of isocyanate reactant to polyol resin reactant can be, for example, 1:1.05 to about 1:4. The combining of the isocyanate and resin reactants initializes the formation of the polyurethane polymer with a stoichiometric excess of the isocyanate reactant. The mixed polyurethane reactants can then be sprayed from the spray gun 225 onto a heated rotating substrate in an amount sufficient to create a polyurethane elastomer reinforcement layer. The polyurethane reaction continues as the reactants are being sprayed onto the top surface of the rotating heated substrate 212. The polyurethane reactants polymerize or gel to form an elastomer in the time range of, for example, 15 seconds to about 120 seconds. If desired, the spraying process 210 may be repeated thereby adding a plurality of layers to the elastomer coated top surface of substrate 212 to create any desired thickness of polyurethane elastomer layer.

As the operator user 138 performs the spraying process, the EQC platform 102 can monitor some or all of the operating characteristics associated with the proportioning system 104, spray gun 106, and spray area 108. The EQC platform 102 can provide feedback to the operator user 138 via a display 110, such as a series of lights or display monitor. If necessary, the EQC platform 102 can provide a notification via the display 110 to the operator user 138 if one or more operating characteristics are out of range or exceed a limit. The operator user 138 can monitor feedback on the display 110. Based on feedback, a notification, or both, the operator user 138 can stop the process and take corrective action to bring the operating characteristic of interest within the desired range, to a specific desired value or condition, or within the desired limit.

In another example, a user such as user 124a can receive a notification from the EQC platform 102, shown in FIG. 2, while the operator user 138 is performing some or all of the process, as described above. If the EQC platform 102 detects an operating characteristic out of range or limit, the EQC platform 102 can transmit a notification via the network 112, such as the Internet, to the user 128a operating an associated client device 114a. The user 124a can receive the notification with information associated with the operating characteristic of interest, and the user 128a can take corrective action to bring the operating characteristic of interest within the desired range, to a specific desired value or condition, or within the desired limit.

In another example, a user, such as user 128a, can receive a notification from the EQC platform 102, shown in FIG. 1, while a spray robot is performing some or all of the process as described above. If the EQC platform 102 detects an operating characteristic out of range or limit, the EQC platform 102 can transmit a notification via the network 112, such as the Internet, to the user 128a operating an associated client device 114a. The user 128a can receive the notification with information associated with the operating characteristic of interest, and the user 128a can take corrective action to bring the operating characteristic of interest within the desired range, to a specific desired value or condition, or within the desired limit.

In yet another example, a user 128a can access current and historical data including operating characteristics collected or otherwise received by the EQC engine 130 and stored in an EQC database 122 shown in FIG. 1. The user 128a can view the data via a user interface or display, and perform additional analysis on such data for each process performed or article manufactured during a process. In at least one embodiment, the EQC engine 130 can determine a trend or generate a chart on a user interface or display to aid the user's analysis or review of the data. In some instances, based in part on the user's or EQC engine's analysis of current and/or historical data, the user 128a can modify or otherwise designate ranges and/or limits for particular operating characteristics. The user modifications or designations to the ranges and/or limits can be stored by the EQC engine 130, and then utilized and monitored in a subsequent process. In other instances, the user 128a can designate or otherwise modify which operating characteristics are monitored for a subsequent process.

As illustrated in the examples above, an EQC system 100 can permit monitoring and control of operating characteristics associated with components used in a process, such as a process to apply a polyurethane composition to a substrate. The monitoring and control of such operating characteristics can increase the ability of a user to produce consistent, high quality articles of manufacture since deviations outside of preferred or desired operating characteristics can be detected as soon as they occur during the process. The monitoring and control can also decrease the occurrence of latent quality problems that may not be identified through normal quality control operations, such as visual inspections and product testing.

It should be noted that the present invention may comprise systems having different architecture than that which is shown in FIG. 1. For example, in some systems, according to the present invention, EQC platform 102 may comprise a single physical or logical server. In one embodiment, the EQC platform 102 can comprise a PLC. The system 100 shown in FIG. 1 is merely exemplary, and is used to help explain the methods illustrated in FIGS. 4 and 5.

Figure 4:
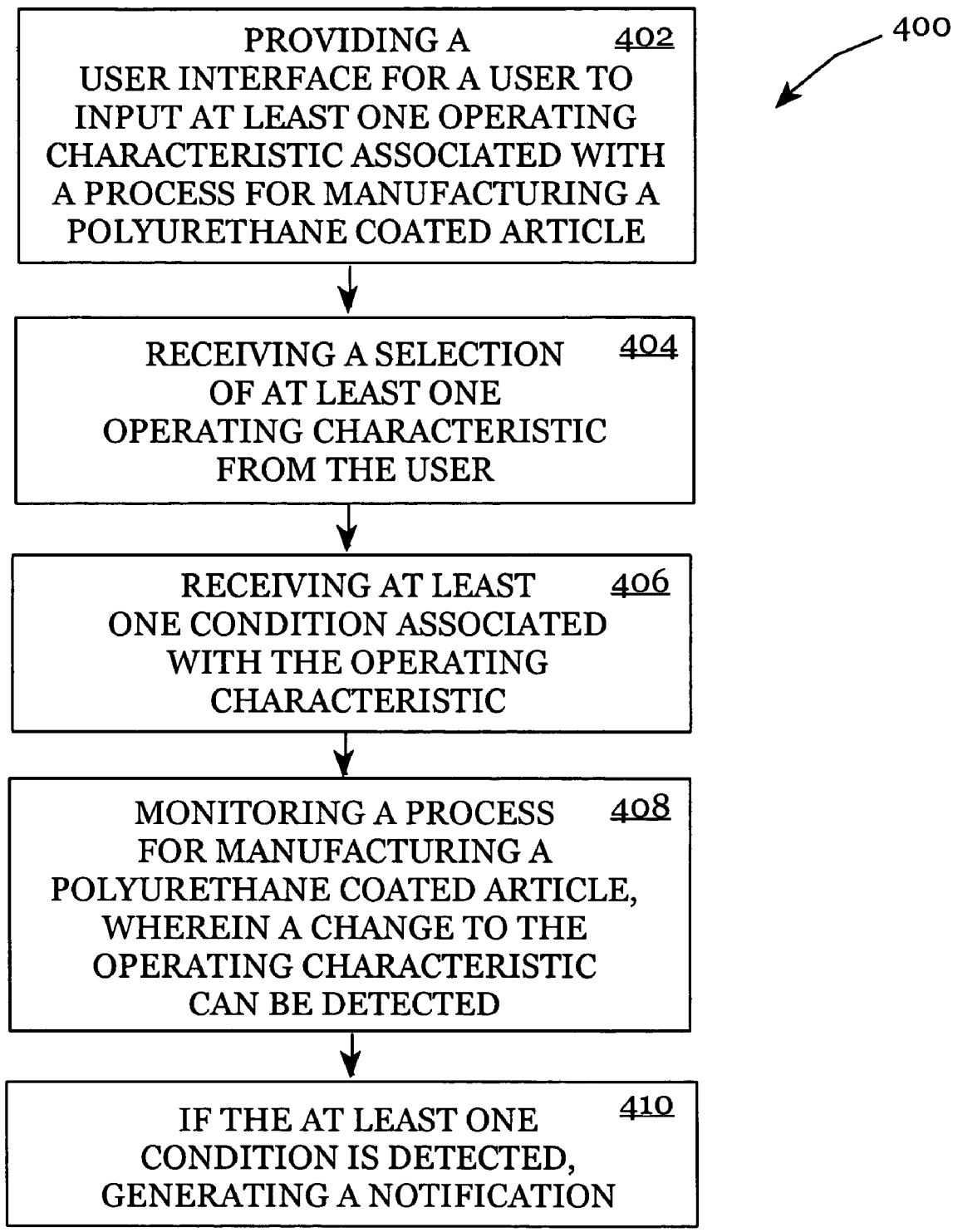
FIG. 4 illustrates a flowchart for a method according to an embodiment of the present invention.

Various methods in accordance with the present invention may be carried out. FIG. 4 illustrates an exemplary method 400 that provides a computer-implemented method for providing electronic quality control during manufacturing a polyurethane coated article, in accordance with one embodiment of the invention. This exemplary method is provided by way of example, as there are a variety of ways to carry out methods according to the present invention. The method 400 shown in FIG. 4 can be executed or otherwise performed by one or a combination of various systems. The method 400 is described below as carried out by the system 100 shown in FIG. 1 by way of example, and various elements of the system 100 are referenced in explaining the example method of FIG. 4.

The method illustrated in FIG. 4 begins in block 402, in which a user interface is provided for a user to input at least one operating characteristic associated with a process for manufacturing a polyurethane coated article. An example of a user interface is shown and described in greater detail as 600 in FIG. 6.

Figure 6:
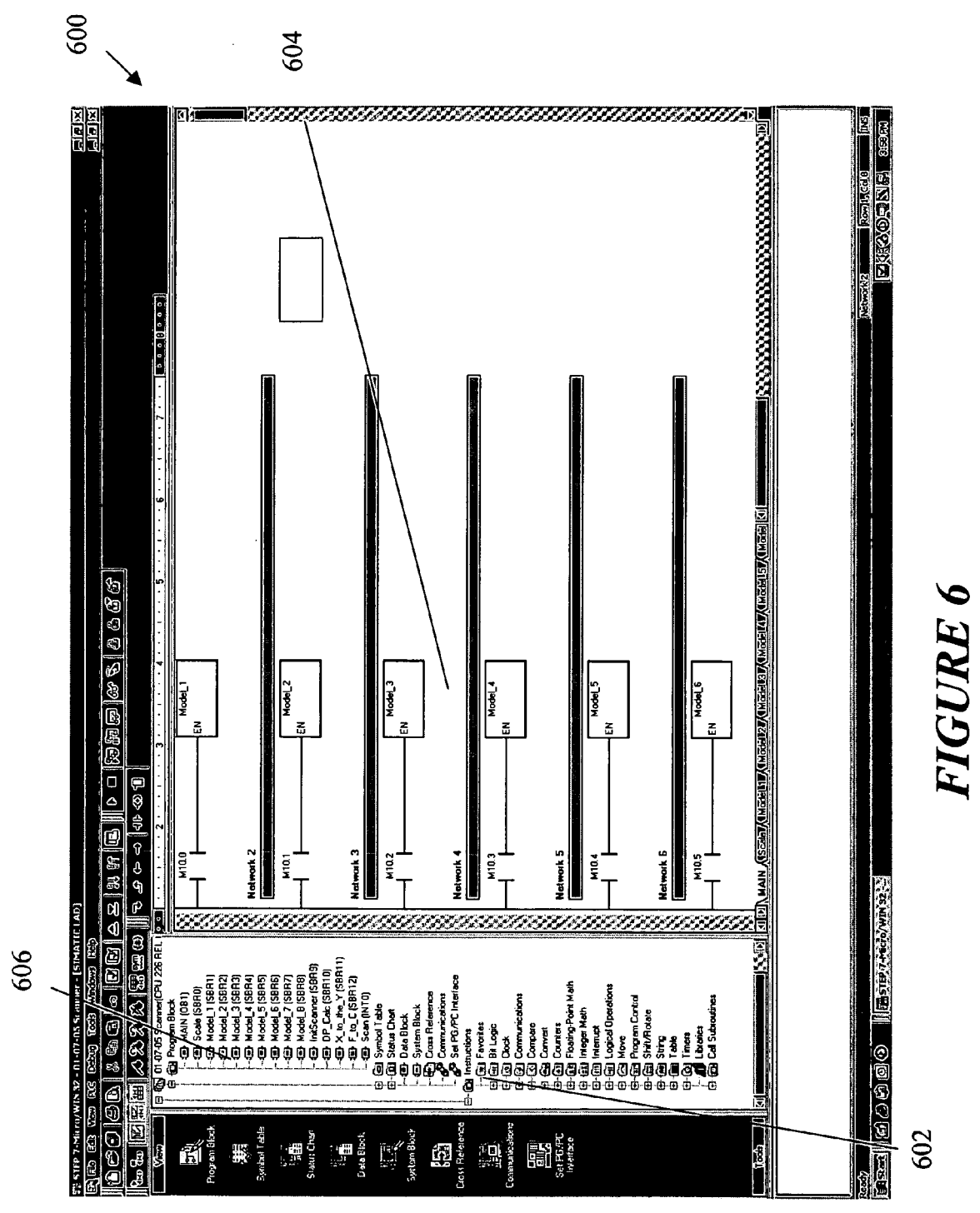

Block 402 is followed by block 404, in which a selection of at least one operating characteristic is received from the user. As shown in FIG. 6, one or more operating characteristics associated with a process such as a process to apply a polyurethane composition to a substrate, can be input via the user interface 600. Various data input devices, such as text windows, pull down menus, and other similar data input devices, can be used in accordance with various embodiments of the invention. For example in one embodiment, an operating characteristic, such as preferred initial surface temperature for a substrate, can be input by a user 128a via the user interface 600 as a range of 95-100° F. In another example in another embodiment, an operating characteristic, such as fluid pressures for two polyurethane components, can be input by an operator user 138 as a range of 900-1000 psi.

Block 404 is followed by block 406, in which at least one condition associated with the operating characteristic is received. As shown in FIG. 6, one or more conditions associated with the operating characteristic can be input via the user interface 600. Various data input devices, such as text windows, pull down menus, and other similar data input devices, can be used in accordance with various embodiments of the invention.

Block 406 is followed by block 408, in which a process for manufacturing a polyurethane coated article is monitored, wherein a change to the operating characteristic can be detected. As shown in FIG. 1, the EQC engine 130 can monitor a process, such as a process to apply a polyurethane composition to a substrate, facilitated by some or all of the proportioning system 104, spray gun 106, spray area 108, and spray robot 116. The EQC engine 130 can monitor some or all of the operating characteristics associated with the process, and system components 104, 106, 108, 116 facilitating the process. Signals from various sensors, such as 136a, or direct measurements provided by system components 104, 106, 108, 116 can be received and processed by the EQC engine 130. Any changes to the operating characteristics being monitored by the EQC engine 130 can be detected by the EQC engine 130.

Block 408 is followed by block 410, in which if the at least one condition is detected, a notification is generated. As shown in FIG. 1, the EQC engine 130 can detect a signal from various sensors, such as 136a, or direct measurements provided by system components 104, 106, 108, 116. If the EQC engine 130 determines at least one condition associated with an operating characteristic exists, then the EQC engine 130 can generate a notification, such as a signal, an alarm, an alert, or otherwise transmit a message to a display 110 or a remote client device 114a-n.

In block 410, the method 400 ends.

In one aspect of an embodiment of the invention, providing a user interface for a user to input at least one operating characteristic associated with a process for manufacturing a polyurethane coated article comprises providing a computer program to receive user input for operating a process for manufacturing a polyurethane coated article.

In one aspect of an embodiment of the invention, an operating characteristic comprises at least one of the following: fluid pressure, fluid pressures for more than one components of a coating applied by a proportioning system, fluid temperature, relative humidity, ambient humidity, dew point, ambient temperature, air volume, air pressure, component fluid temperatures, component fluid pressures, operating status (on/off), output rate of mixed material, output rate of a component material, position of an arm associated with the spray robot, position of a spray gun or device associated with the spray robot, position of a turntable/platform, rotation rate of a turntable/platform, stroke count, surface temperature of a work piece substrate, air flow, and inlet air pressure.

In one aspect of an embodiment of the invention, receiving at least one condition associated with the operating characteristic comprises at least one of the following: receiving a value for the operating characteristic, receiving a setting for the operating characteristic, receiving a range of values for the operating characteristic, receiving an upper limit value for the operating characteristic, receiving a lower limit value for the operating characteristic, receiving a percentage change over time value associated with the operating characteristic, receiving a percentage associated with the operating characteristic, and receiving a condition associated with operation of a device.

In one aspect of an embodiment of the invention, the process comprises at least one of the following: spraying a polyurethane coating on a work piece, spraying a polyurethane coating on a material, coating a shell with a polyurethane, coating a shell with at least one flow provided by a spray gun, coating a shell with at least one flow provided by a spray robot, and spraying at least one material on another material.

In one aspect of an embodiment of the invention, generating a notification comprises at least one of the following: activating an alarm, activating a light, activating a set of lights, transmitting a message to a remote communication device, transmitting an e-mail, and displaying a message on a display.

In one aspect of an embodiment of the invention, the method further comprises storing data during monitoring of the process associated with manufacturing a polyurethane coated article, wherein the data includes information associated with the operating characteristic.

In one aspect of an embodiment of the invention, the data is stored in at least one of the following: an EQC database, a database, memory, and a data storage device.

In one aspect of an embodiment of the invention, the method further comprises displaying data during monitoring of the process for manufacturing a polyurethane coated article.

In one aspect of an embodiment of the invention, the data is displayed on at least one of the following: a display, a light, a set of lights, a display monitor, a remote communication device, a smart phone, an e-mail device, and a PDA.

In one aspect of an embodiment of the invention, the method further comprises in response to the notification, receiving an instruction to correct the at least one condition.

In one aspect of an embodiment of the invention, the method further comprises identifying at least one trend associated with the data during monitoring the process, and displaying the at least one trend with respect to data associated with the at least one condition.

Figure 5:
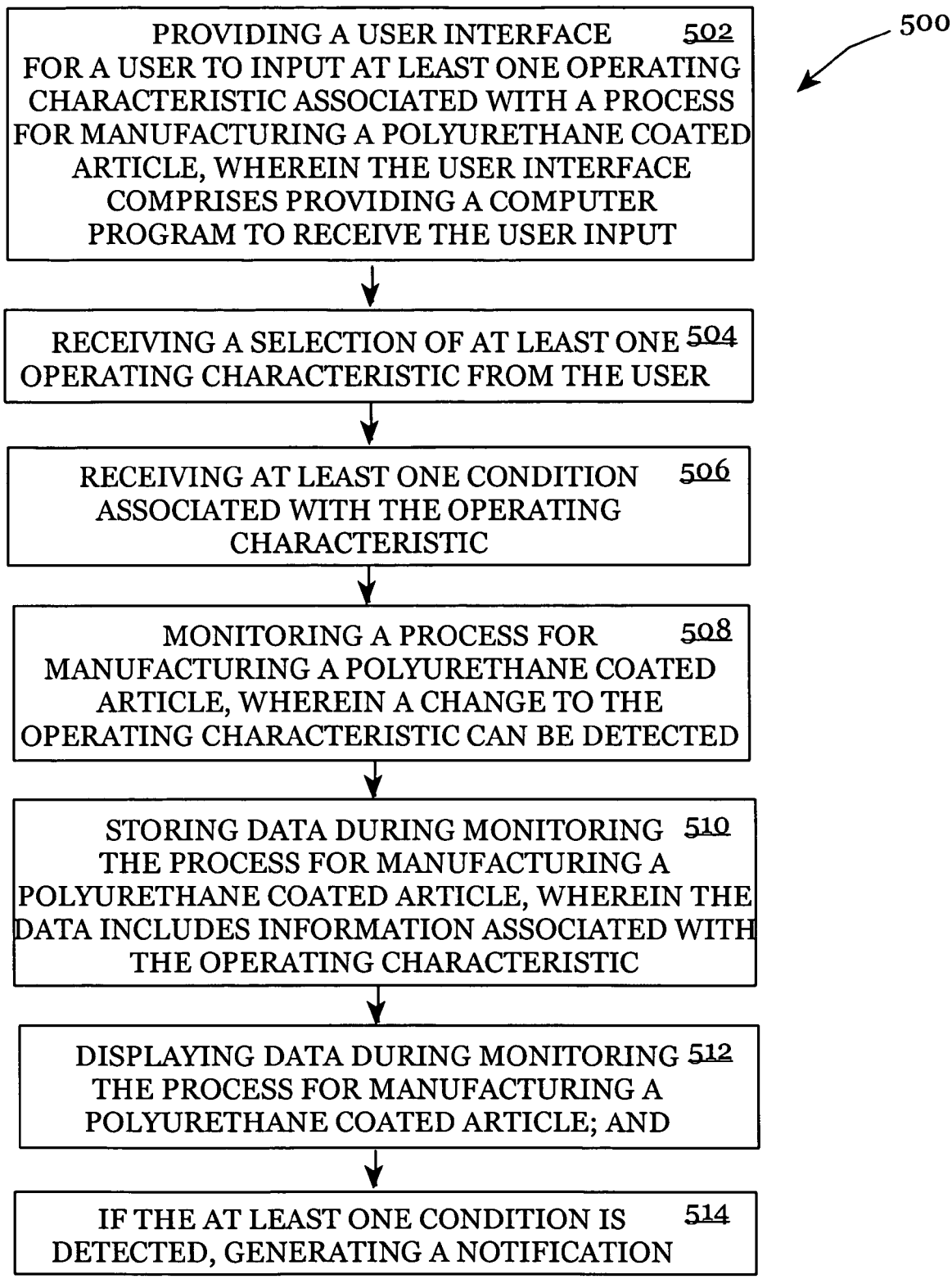
FIG. 5 illustrates another flowchart for a method according to an embodiment of the present invention.

FIG. 5 illustrates an exemplary method 500 that provides a method for providing electronic quality control during manufacturing a polyurethane coated article with a spray robot, in accordance with one embodiment of the invention. This exemplary method is provided by way of example, as there are a variety of ways to carry out methods according to the present invention. The method 500 shown in FIG. 5 can be executed or otherwise performed by one or a combination of various systems. The method 500 is described below as carried out by the system 100 shown in FIG. 1 by way of example, and various elements of the system 100 are referenced in explaining the example method of FIG. 5.

The method illustrated in FIG. 5 begins in block 502, in which a user interface for a user to input at least one operating characteristic associated with a process for manufacturing a polyurethane coated article is provided, wherein the user interface comprises providing a computer program to receive the user input. An example of a user interface is shown and described in greater detail as 600 in FIG. 6.

Block 502 is followed by block 504, in which a selection of at least one operating characteristic is received from the user. As shown in FIG. 6, one or more operating characteristics associated with a process, such as a process to apply a polyurethane composition to a substrate, can be input via the user interface 600. Various data input devices, such as text windows, pull down menus, and other similar data input devices, can be used in accordance with various embodiments of the invention. For example in one embodiment, an operating characteristic, such as preferred initial surface temperature for a substrate, can be input by a user 128*a* via the user interface 600 as a range of approximately 95-100° F. In another example in another embodiment, an operating characteristic, such as fluid pressures for two polyurethane components, can be input by a user 128*a* as a range of approximately 900-1000 psi.

Block 504 is followed by block 506, in which at least one condition associated with the operating characteristic is received. As shown in FIG. 6, one or more conditions associated with the operating characteristic can be input via the user interface 600. Various input devices, such as text windows, pull down menus, and other data input devices, can be used in accordance with various embodiments of the invention.

Block 506 is followed by block 508, in which a process for manufacturing a polyurethane coated article is monitored, wherein a change to the operating characteristic can be detected. As shown in FIG. 1, the EQC engine 130 can monitor a process, such as a process to apply a polyurethane composition to a substrate, facilitated by some or all of the proportioning system 104, spray gun 106, spray area 108, and spray robot 116. The EQC engine 130 can monitor some or all of the operating characteristics associated with the process, and system components 104, 106, 108, 116 facilitating the process. Signals from various sensors, such as 136*a*, or direct measurements provided by system components 104, 106, 108, 116 can be received and processed by the EQC engine 130. Any changes to the operating characteristics being monitored by the EQC engine 130 can be detected by the EQC engine 130.

Block 508 is followed by block 510, in which data is stored during monitoring the process for manufacturing a polyurethane coated article, wherein the data includes information associated with the operating characteristic. As shown in FIG. 1, the EQC engine 130 can transmit data collected from the system components 104, 106, 108, 116 to the EQC database 122, or other data storage device. The EQC database 122 can store the data for subsequent retrieval by the EQC engine 130, by a user 128*a-n*, or by an operator user 138.

Block 510 is followed by block 512, in which data is displayed during monitoring the process for manufacturing a polyurethane coated article. As shown in FIG. 1, the EQC engine 130 can facilitate display of some or all data collected from the system components 104, 106, 108, 116 via a display 110 or remote client device 114*a-n*.

Block 512 is followed by block 514, in which if the at least one condition is detected, a notification is generated. As shown in FIG. 1, the EQC engine 130 can detect a signal from various sensors, such as 136*a*, or direct measurements provided by system components 104, 106, 108, 116. If the EQC engine 130 determines at least one condition associated with an operating characteristic exists, then the EQC engine 130 can generate a notification, such as a signal, an alarm, an alert, or otherwise transmit a message to a display 110 or remote client device 114*a-n*.

In block 514, the method 500 ends.

In one aspect of an embodiment of the invention, an operating characteristic comprises at least one of the following: fluid pressure, fluid pressures for more than one components of a coating applied by a proportioning system, fluid temperature, relative humidity, ambient humidity, dew point, ambient temperature, air volume, air pressure, component fluid temperatures, component fluid pressures, operating status (on/off), output rate of mixed material, output rate of a component material, position of an arm associated with the spray robot, position of a spray gun or device associated with the spray robot, position of a turntable/platform, rotation rate of a turntable/platform, stroke count, surface temperature of a work piece substrate, air flow, and inlet air pressure.

In one aspect of an embodiment of the invention, receiving at least one condition associated with the operating characteristic comprises at least one of the following: receiving a value for the operating characteristic, receiving a setting for the operating characteristic, receiving a range of values for the operating characteristic, receiving an upper limit value for the operating characteristic, receiving a lower limit value for the operating characteristic, receiving a percentage change over time value associated with the operating characteristic, receiving a percentage associated with the operating characteristic, and receiving a condition associated with operation of a device.

In one aspect of an embodiment of the invention, the process comprises at least one of the following: spraying a polyurethane coating on a work piece, spraying a polyurethane coating on a material, coating a shell with a polyurethane, coating a shell with at least one flow provided by a spray gun, coating a shell with at least one flow provided by a spray robot, and spraying at least one material on another material.

In one aspect of an embodiment of the invention, generating a notification comprises at least one of the following: activating an alarm, activating a light, activating a set of lights, transmitting a message to a remote communication device, transmitting an e-mail, and displaying a message on a display.

In one aspect of an embodiment of the invention, the data is stored in at least one of the following: an EQC database, a database, memory, and a data storage device.

In one aspect of an embodiment of the invention, the data is displayed on at least one of the following: a display, a light, a set of lights, a display monitor, a remote communication device, a smart phone, an e-mail device, and a PDA.

In one aspect of an embodiment of the invention, the method further comprises in response to the notification, receiving an instruction to correct the at least one condition.

In one aspect of an embodiment of the invention, the method further comprises identifying at least one trend associated with the data during monitoring the process, and displaying the at least one trend with respect to data associated with the at least one condition.

FIGS. 6, 7, 8A, and 8B illustrate examples of user interfaces in accordance with an embodiment of the present invention. These exemplary user interfaces are provided by way of example, as there are a variety of ways to provide user interfaces according to the present invention. The user interfaces shown in FIGS. 6, 7, 8A, and 8B can be executed or otherwise performed by one or a combination of various systems. The user interfaces shown in FIGS. 6, 7, 8A, and 8B are described below as carried out by the system 100 shown in FIG. 1 by way of example.

FIG. 6 illustrates an example of a user interface associated with an embodiment of the present invention. The user interface 600 shown illustrates one example of a user interface to permit a user 128*a-n* or operator user 138 to input or otherwise enter one or more operating characteristics and associated conditions for monitoring and control. Various data input devices, such as text windows, pull down menus, drag and drop objects, and other data input devices, can be used in accordance with various embodiments of the invention. One suitable user interface can be provided by a computer software program such as MicroWin 3.2.7, distributed by Siemens AG of Munich, Germany.

The user interface 600 shown includes one or more data input devices not shown) adapted to receive a user input. A user, such as 128a-n or operator user 138, can utilize an associated input device such as a keyboard or mouse to select a model of substrates to be coated from a list or set of folders 606 and an associated particular operating characteristic from a list or set of folders 602. The user can then highlight the desired operating characteristic in field 604, and enter a user input, including but not limited to, text, values, an indication, condition, or other data to be associated with the operating characteristic. In this manner, a user can associate a condition with an operating characteristic, such as, for example, a range associated with a operating characteristic, a lower limit for an operating characteristic, a set point for an operating characteristic, an upper limit for an operating characteristic, or a percentage change over time for an operating characteristic.

Figure 7:
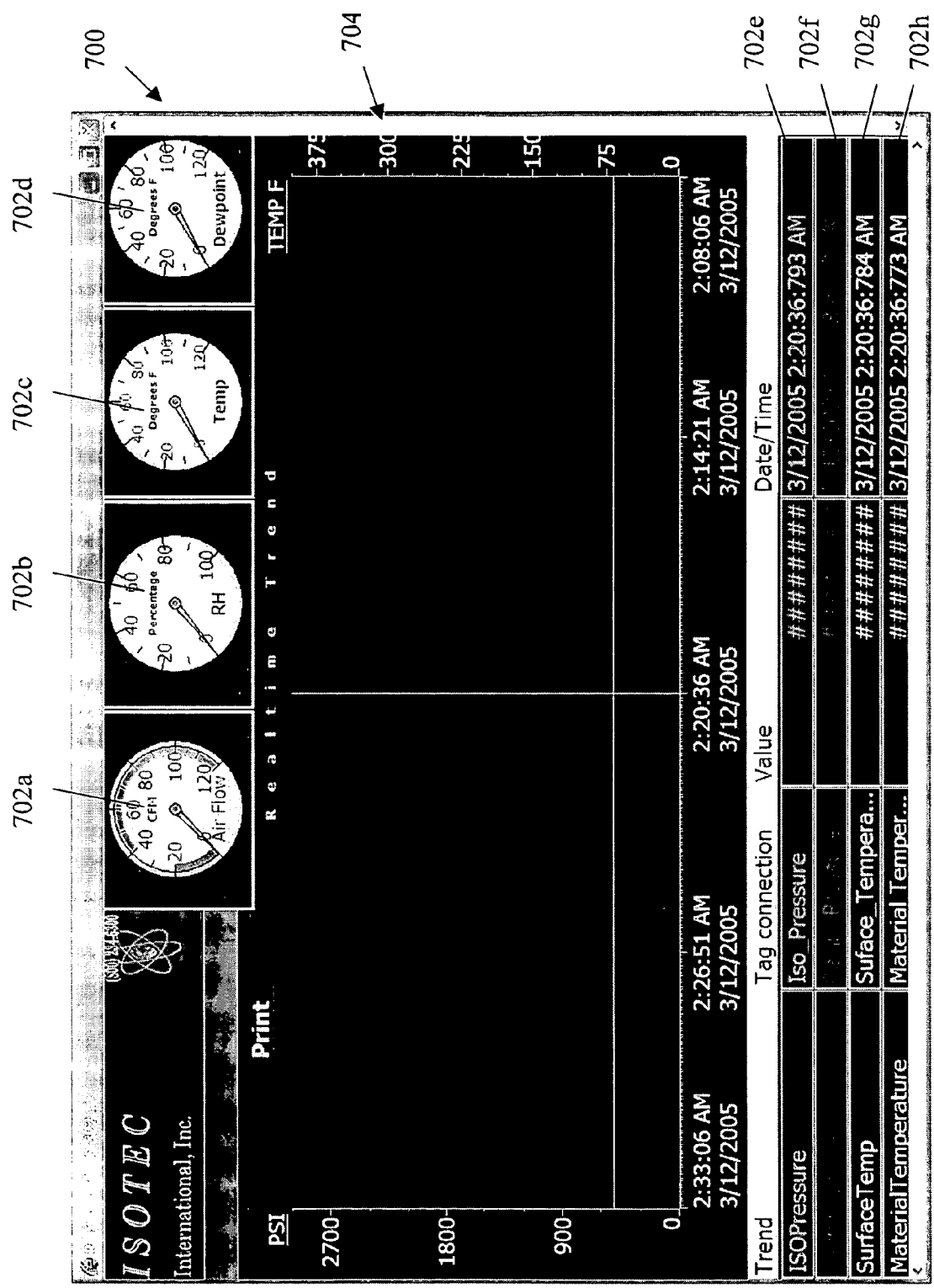
FIG. 7 illustrates another user interface for a system according to an embodiment of the present invention.

FIG. 7 illustrates an example of a user interface associated with an embodiment of the present invention. The user interface 700 shown illustrates on example of a user interface to permit a user 128a-n, or operator user 138, to continuously monitor and control one more operating characteristics and associated conditions for monitoring. Some or all monitored operating characteristics can be displayed by the EQC engine 130 in any suitable format including, but not limited to, bar graph, graph, and alphanumeric data. One suitable user interface can be provided by a computer software program such as ProTool Pro, distributed by Siemens AG of Munich, Germany.

The user interface 700 shown includes one or more data output devices 702a-h adapted to output data for viewing by a user such as 128a-n or operator user 138. Via the data output devices 702a-h, one or more operating characteristics can be shown, such as relative humidity, ambient temperature, dew point, ISO pressure, resin pressure, substrate surface temperature, substrate material temperature, and plant pressure. Associated data can also be shown in adjacent data output devices including, but not limited to, tag connection, value, date, and time.

In the embodiment shown, the user interface 700 can output a graphical, real time trend chart 704. The trend chart 704 can utilize previously stored historical and/or current conditions for one or more monitored operating characteristics. Other types of graphics and charts can be utilized in a user interface in accordance with other embodiments of the invention.

Figure 8A:
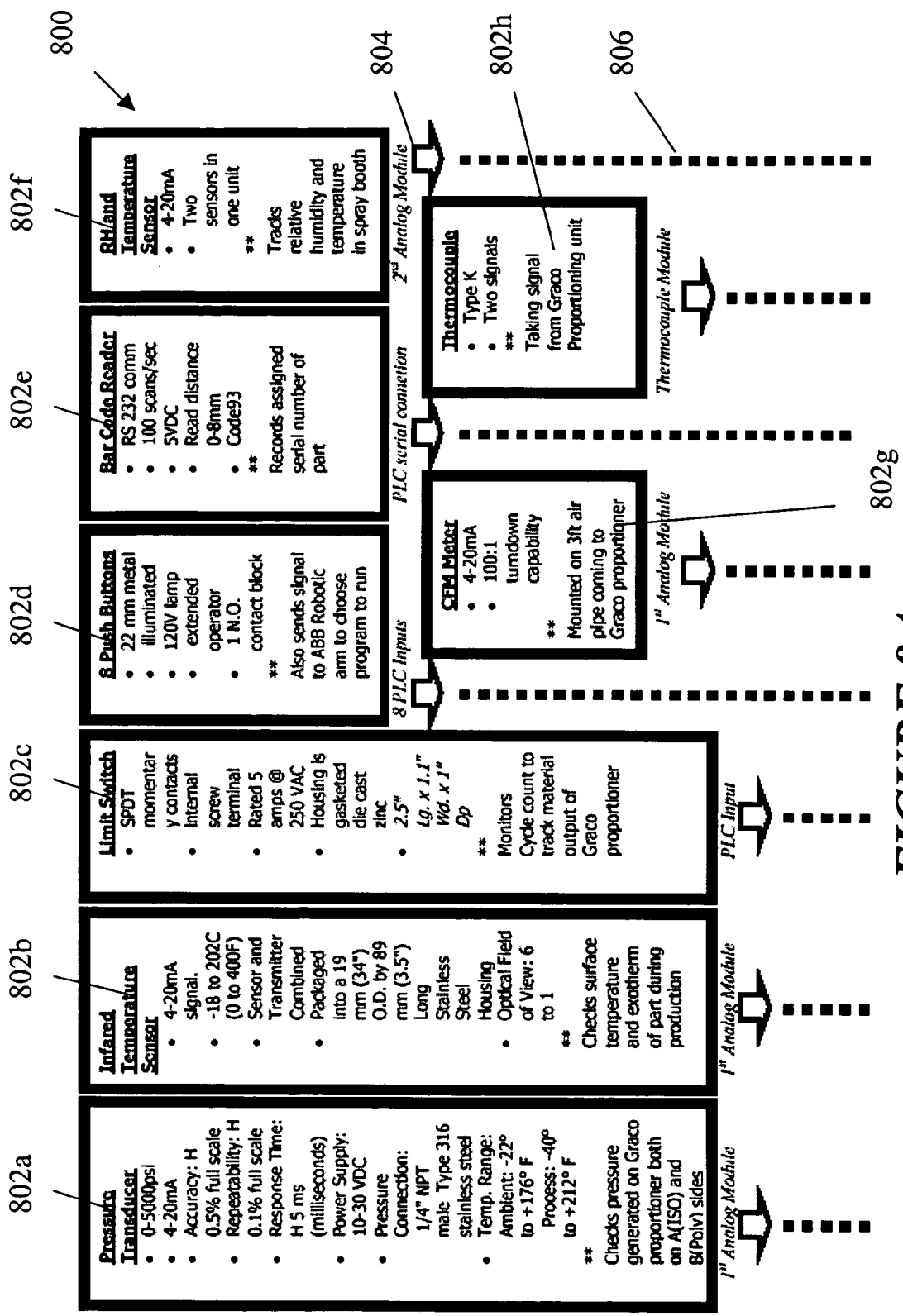
FIG. 8A illustrates another user interface for a system according to an embodiment of the present invention.
Figure 8B:
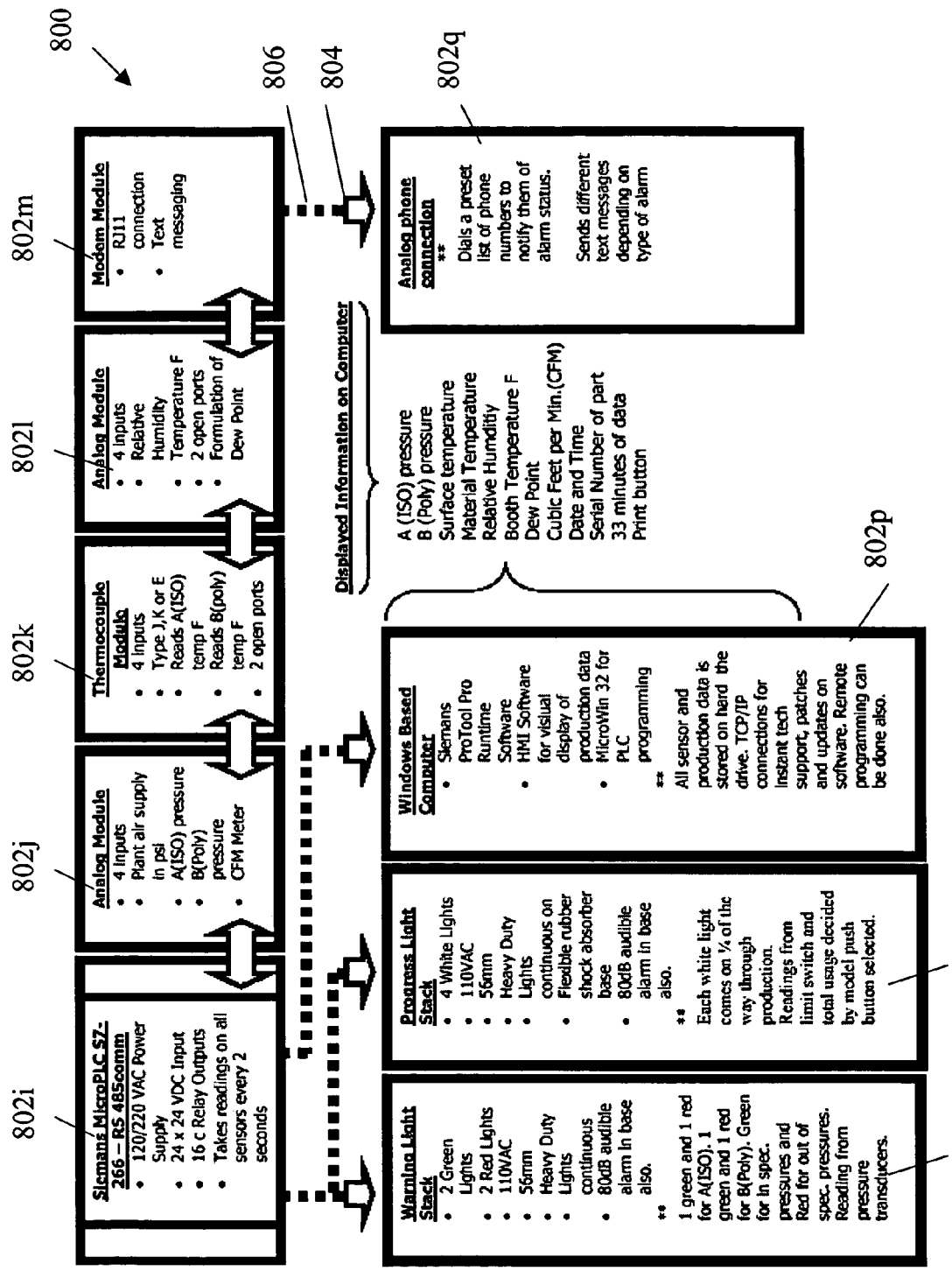
FIG. 8B illustrates another user interface for a system according to an embodiment of the present invention.

FIGS. 8A and 8B illustrate another example of a user interface associated with an embodiment of the present invention. The user interface 800 shown illustrates an example of a user interface to permit a user 128a-n or operator user 138 to generate a process flow for monitoring and controlling a process such as a process to apply a polyurethane coating to a substrate. The user interface 800 shown in FIGS. 8A and 8B can display one or more flow data output devices 802a-q adapted to output data for viewing by a user such as 128a-n or operator user 138. Via the flow data output devices 802a-q, a user can organize a process flow to monitor and control a process to apply a polyurethane coating to a substrate. Directional devices, such as arrows 804 and flow lines 806, can also be utilized by the user interface 800 to generate a process flow for monitoring and control.

In the embodiment shown, the user interface 800 can output a process flow chart for a process to apply a polyurethane coating to a substrate. The user interface 800 can incorporate one or more operating characteristics and associated conditions in some or all of the flow data output devices 802a-q. In some instances, notes and other flow data information can be outside of a flow data output device 802a-q. Lines 806 and associated arrows 804 can connect between some or all of the flow data output devices 802a-q depending on the various components of the system 100 monitored or otherwise controlled in a desired process. Other combinations of flow data output devices, arrows, and lines can be utilized in a user interface in accordance with other embodiments of the invention While the above description contains many specifics, these specifics should not be construed as limitations on the scope of the invention, but merely as exemplifications of the disclosed embodiments. Those skilled in the art will envision any other possible variations that are within the scope of the invention.

The invention claimed is:

1. A computer-implemented method for providing electronic quality control during manufacturing of a polyurethane coated article, comprising:
    providing a user interface for a user to input at least two operating characteristics associated with a process for manufacturing a polyurethane coated article;
    receiving a selection of the at least two operating characteristics from the user;
    receiving at least one condition associated with each selected operating characteristic;
    monitoring a process for manufacturing a polyurethane coated article, wherein a change to either of the selected operating characteristics can be detected; and
    generating a notification when the at least one condition associated with either of said two selected operating characteristics is detected, wherein one of said at least two operating characteristics is fluid pressures of two or more polyurethane reactants of a fluid proportioning system associated with the process for manufacturing a polyurethane coated article and the other of said at least two operating characteristics is surface temperature of a work piece substrate to be coated.

2. The computer-implemented method of claim 1, wherein providing a user interface for a user to input at least two operating characteristic associated with a process for manufacturing a polyurethane coated article comprises providing a computer program to receive user input for operating a process for manufacturing a polyurethane coated article.

3. The computer-implemented method of claim 1, wherein an additional operating characteristic is selected from fluid pressure, fluid temperature, relative humidity, ambient humidity, dew point, ambient temperature, air volume, air pressure, component fluid temperatures, component fluid pressures, operating status, output rate of mixed material, output rate of a component material, position of an arm associated with a spray robot, position of a spray gun or device associated with a spray robot, position of a turntable/platform, rotation rate of a turntable/platform, stroke count, or inlet air pressure.

4. The computer-implemented method of claim 1, wherein receiving at least one condition associated with one of the at least two selected operating characteristics comprises at least one of the following: receiving a value for the operating condition, receiving a setting for the operating condition, receiving a range of values for the operating characteristic, receiving an upper limit value for the operating characteristic, receiving a lower limit value for the operating characteristic, receiving a percentage change over time value associated with the operating characteristic, receiving a percentage associated with the operating characteristic, and receiving a condition associated with operation of a device.

5. The computer-implemented method of claim 1, wherein the process comprises at least one of the following: spraying a polyurethane coating on a work piece, spraying a polyurethane coating on a material, coating a shell with a polyurethane, coating a shell with at least one flow provided by a spray gun, coating a shell with at least one flow provided by a spray robot, and spraying at least one material on another material.

6. The computer-implemented method of claim 1, wherein generating a notification comprises at least one of the following: activating an alarm, activating a light, activating a set of lights, transmitting a message to a remote communication device, transmitting an e-mail, and displaying a message on a display.

7. The computer-implemented method of claim 1, further comprising:
storing data during monitoring of the process for manufacturing a polyurethane coated article, wherein the data includes information associated with the at least two selected operating characteristics.

8. The computer-implemented method of claim 7, wherein the data is stored in at least one of the following: an electronic quality control (EQC) database, a database, memory, and a data storage device.

9. The computer-implemented method of claim 1, further comprising:
displaying data during monitoring of the process for manufacturing a polyurethane coated article.

10. The computer-implemented method of claim 9, wherein the data is displayed on at least one of the following: a display, a light, a set of lights, a display monitor, a remote communication device, a smart phone, an e-mail device, and a personal digital assistant (PDA).

11. The computer-implemented method of claim 1, further comprising:
in response to the notification, receiving an instruction to correct the at least one condition.

12. The computer-implemented method of claim 7, further comprising:
identifying at least one trend associated with the data during monitoring the process; and
displaying the at least one trend with respect to data associated with the at least one condition.

13. An electronic quality control system for manufacturing a polyurethane coated article, comprising:
a user interface adapted to:
receive a user input of at least two operating characteristics associated with a process for manufacturing a polyurethane coated article; and
a processor adapted to:
receive a selection of at least two operating characteristics from the user, wherein one of said at least two operating characteristics is fluid pressures of two or more polyurethane reactants of a fluid proportioning system associated with manufacturing the polyurethane coated article and the other of said at least two operating characteristics is surface temperature of a work piece substrate;
receive at least one condition associated with each operating characteristic;
monitor a process for manufacturing a polyurethane coated article, wherein a change to each operating characteristic can be detected; and
generate a notification when at least one condition is detected.

14. The electronic quality control system of claim 13, wherein the user interface comprises a computer program adapted to receive user input for monitoring and controlling a process for manufacturing a polyurethane coated article.

15. The electronic quality control system of claim 13, wherein an additional operating characteristic is selected from fluid pressure, fluid temperature, relative humidity, ambient humidity, dew point, ambient temperature, air volume, air pressure, component fluid temperatures, component fluid pressures, operating status, output rate of mixed material, output rate of a component material, position of an arm associated with a spray robot, position of a spray gun or device associated with a spray robot, position of a turntable/platform, rotation rate of a turntable/platform, stroke count, air flow, or inlet air pressure.

16. The electronic quality control system of claim 13, wherein to receive at least one condition associated with one of the at least two selected operating characteristics comprises at least one of the following: receiving a value for the operating condition, receiving a setting for the operating condition, receiving a range of values for the operating characteristic, receiving an upper limit value for the operating characteristic, receiving a lower limit value for the operating characteristic, receiving a percentage change over time value associated with the operating characteristic, receiving a percentage associated with the operating characteristic, and receiving a condition associated with operation of a device.

17. The electronic quality control system of claim 13, wherein the process comprises at least one of the following: spraying a polyurethane coating on a work piece, spraying a polyurethane coating on a material, coating a shell with a polyurethane, coating a shell with at least one flow provided by a spray gun, coating a shell with at least one flow provided by a spray robot, and spraying at least one material on another material.

18. The electronic quality control system of claim 13, wherein generate a notification comprises at least one of the following: activating an alarm, activating a light, activating a set of lights, transmitting a message to a remote communication device, transmitting an e-mail, and displaying a message on a display.

19. The electronic quality control system of claim 13, wherein the processor is further adapted to:
store data during monitoring the process for manufacturing a polyurethane coated article, wherein the data includes information associated with the at least two selected operating characteristics.

20. The electronic quality control system of claim 19, wherein the data is stored in at least one of the following: an electronic quality control (EQC) database, a database, memory, and a data storage device.

21. The electronic quality control system of claim 13, wherein the processor is further adapted to:
display data during monitoring the process for manufacturing a polyurethane coated article.

22. The electronic quality control system of claim 21, wherein the data is displayed on at least one of the following: a display, a light, a set of lights, a display monitor, a remote communication device, a smart phone, an e-mail device, and a personal digital assistant (PDA).

23. The electronic quality control system of claim 13, wherein the processor is further adapted to:
in response to the notification, receive an instruction to correct the at least one condition.

24. The electronic quality control system of claim 19, wherein the processor is further adapted to:
identify at least one trend associated with the data during monitoring the process; and
display the at least one trend.

25. A computer-implemented method for providing electronic quality control during manufacturing of a polyurethane coated article with a spray robot, comprising:
providing a user interface for a user to input at least two operating characteristic associated with a process for manufacturing a polyurethane coated article, wherein the user interface comprises a computer program to receive the user input;
receiving a selection of at least two operating characteristic from the user;
receiving at least one condition associated with each selected operating characteristic;
monitoring a process for manufacturing a polyurethane coated article, wherein a change to each selected operating characteristic can be detected;
storing data during monitoring of the process for manufacturing a polyurethane coated article, wherein the data includes information associated with each selected operating characteristic;
displaying the data associated with each selected operating characteristic during monitoring the process for manufacturing a polyurethane coated article; and
generating a notification when at least one condition is detected, wherein one of said at least two operating characteristic is fluid pressures for two or more polyurethane reactants of a fluid proportioning system associated with manufacturing the polyurethane coated article and the other of said at least two selected operating characteristics is surface temperature of a work piece substrate.

26. The computer-implemented method of claim 25, wherein an operating characteristic is selected from fluid pressure, fluid temperature, relative humidity, ambient humidity, dew point, ambient temperature, air volume, air pressure, component fluid temperatures, component fluid pressures, operating status, output rate of mixed material, output rate of a component material, position of an arm associated with a spray robot, position of a spray gun or device associated with a spray robot, position of a turntable/platform, rotation rate of a turntable/platform, stroke count, air flow, or inlet air pressure.

27. The computer-implemented method of claim 25, wherein receiving at least one condition associated with one of the at least two selected operating characteristics comprises at least one of the following: receiving a value for the operating condition, receiving a setting for the operating condition, receiving a range of values for the operating characteristic, receiving an upper limit value for the operating characteristic, receiving a lower limit value for the operating characteristic, receiving a percentage change over time value associated with the operating characteristic, receiving a percentage associated with the operating characteristic, and receiving a condition associated with operation of a device.

28. The computer-implemented method of claim 25, wherein the process comprises at least one of the following: spraying a polyurethane coating on a work piece, spraying a polyurethane coating on a material, coating a shell with a polyurethane, coating a shell with at least one flow provided by a spray gun, coating a shell with at least one flow provided by a spray robot, and spraying at least one material on another material.

29. The computer-implemented method of claim 25, wherein generating a notification comprises at least one of the following: activating an alarm, activating a light, activating a set of lights, transmitting a message to a remote communication device, transmitting an e-mail, and displaying a message on a display.

30. The computer-implemented method of claim 25, wherein the data associated with the at least two selected operating characteristics is stored in at least one of the following: an electronic quality control (EQC) database, a database, memory, and a data storage device.

31. The computer-implemented method of claim 25, wherein the data associated with the at least two selected operating characteristics is displayed on at least one of the following: a display, a light, a set of lights, a display monitor, a remote communication device, a smart phone, an e-mail device, and a personal digital assistant (PDA).

32. The computer-implemented method of claim 25, further comprising:
in response to the notification, receiving an instruction to correct the at least one condition.

33. The computer-implemented method of claim 25, further comprising:
identifying at least one trend associated with the data associated with the at least two selected operating characteristic during monitoring the process; and
displaying the at least one trend.

34. A computer-implemented method for providing electronic quality control during manufacturing of a polyurethane coated article comprising:
selecting from a user interface two operating characteristics associated with a process for manufacturing a polyurethane coated article, wherein one of said two operating characteristics is fluid pressures of a polyol reactant and an isocyanate reactant of a fluid proportioning pump associated with the process for manufacturing a polyurethane coated article and the other of said two operating characteristics is surface temperature of a work piece substrate to be coated;
separately providing a polyol reactant and an isocyanate reactant to a multi-component proportioning pump;
separately monitoring the pressure of the isocyanate reactant and the polyol reactant in the proportioning pump;
monitoring the surface temperature of the substrate;
separately feeding the polyol reactant and the isocyanate reactant from the proportioning pump to a sprayer;
mixing the polyol reactant and the isocyanate reactant in the sprayer to form a polyurethane reactant mixture;
spraying the polyurethane reactant mixture onto the substrate; and
generating a notification when the pressure of the isocyanate reactant corresponds to a selected condition, the pressure of the polyol reactant corresponds to a selected condition or the surface temperature of the substrate corresponds to a selected condition.

35. The computer-implemented method of claim 34 further comprising:
monitoring the ambient temperature and relative humidity adjacent the substrate; and
generating a notification when the relative humidity or ambient temperature corresponds to a selected condition.

36. The computer-implemented method of claim 34 further comprising:
monitoring the dew point adjacent the substrate; and
generating a notification when the dew point corresponds to a selected condition.

37. The computer-implemented method of claim 35 further comprising:
monitoring an output rate of the polyurethane reactant mixture from the sprayer; and
generating a notification when the output rate corresponds to a selected condition.

38. The computer-implemented method of claim 37, wherein the notification comprises a set of lights.

39. The computer-implemented method of claim 37 further comprising:
providing air to the sprayer to spray the polyurethane reactant mixture therefrom;
monitoring the air pressure and air volume provided to the sprayer; and
generating a notification when the air pressure or air volume provided to the sprayer corresponds to a selected condition.

40. The computer-implemented method of claim 39 further comprising:
separately monitoring the output rate of the polyol reactant and the isocyanate reactant; and
generating a notification when the output rate of either the polyol reactant or the isocyanate reactant corresponds to a selected condition.

41. The computer-implemented method of claim 40 further comprising:
separately monitoring the temperature of the polyol reactant and the isocyanate reactant; and
generating a notification when the temperature of either the polyol reactant or the isocyanate reactant corresponds to a selected condition.

42. The computer-implemented method of claim 41 further comprising:
rotating the substrate on a turntable/platform;
monitoring the position and rate of rotation of the turntable/platform; and
generating a notification when the position or rate of rotation of the turntable/platform corresponds to a selected condition.

* * * * *